US007713402B2

(12) United States Patent
Enda et al.
(10) Patent No.: US 7,713,402 B2
(45) Date of Patent: May 11, 2010

(54) METHOD FOR TREATING A CHEMICAL DECONTAMINATION SOLUTION

(75) Inventors: Masami Enda, Kanagawa-ken (JP); Yumi Yaita, Tokyo (JP); Norihisa Saito, Kanagawa-ken (JP); Hiromi Aoi, Kanagawa-ken (JP); Ichiro Inami, Tokyo (JP); Hitoshi Sakai, Kanagawa-ken (JP); Satoshi Hiraragi, Kanagawa-ken (JP); Yoshinari Takamatsu, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1238 days.

(21) Appl. No.: 11/147,455

(22) Filed: Jun. 8, 2005

(65) Prior Publication Data

US 2006/0041176 A1 Feb. 23, 2006

Related U.S. Application Data

(63) Continuation of application No. 10/024,531, filed on Dec. 21, 2001, now abandoned.

(30) Foreign Application Priority Data

Dec. 21, 2000 (JP) ............................ 2000-388078
Aug. 8, 2001 (JP) ............................ 2001-240958

(51) Int. Cl.
*C02F 1/46* (2006.01)

(52) U.S. Cl. ....................... 205/688; 205/704; 205/756; 204/272; 134/3

(58) Field of Classification Search ................. 205/688, 205/704, 756; 204/272; 134/3, 10, 26, 41, 134/109
See application file for complete search history.

(56) References Cited

U.S. PATENT DOCUMENTS

| | | | | |
|---|---|---|---|---|
| 4,056,482 | A * | 11/1977 | Schmieder et al. | 205/688 |
| 4,287,002 | A | 9/1981 | Torok | |
| 4,537,666 | A * | 8/1985 | Murray et al. | 205/673 |
| 4,654,170 | A | 3/1987 | Murray | |
| 4,756,768 | A | 7/1988 | Bertholdt et al. | |
| 4,942,594 | A * | 7/1990 | Bertholdt et al. | 376/310 |
| 6,635,232 | B1 * | 10/2003 | Yaita et al. | 423/658.5 |

FOREIGN PATENT DOCUMENTS

| | | | |
|---|---|---|---|
| EP | 1 054 413 | A2 * | 11/2000 |
| JP | 05-209997 | A | 8/1993 |
| JP | 07-140296 | A | 6/1995 |
| JP | 09-159798 | A | 6/1997 |
| JP | 09-510784 | A | 10/1997 |
| JP | 2000-081498 | A | 3/2000 |
| WO | WO 84/03170 | * | 8/1984 |
| WO | WO 84/03170 | A1 | 8/1984 |

* cited by examiner

*Primary Examiner*—Arun S Phasge
(74) *Attorney, Agent, or Firm*—Foley & Lardner LLP

(57) ABSTRACT

Chemical decontamination method of dissolving oxide film adhered to contaminated component including, preparing decontamination solution in which ozone is dissolved and oxidation additive agent, which suppresses corrosion of metal base of the contaminated component, is added, and applying the decontamination solution to the contaminated component, thereby to remove the oxide film by oxidation.

3 Claims, 9 Drawing Sheets

METHOD FOR TREATING A CHEMICAL DECONTAMINATION SOLUTION

CROSS-REFERENCE TO RELATED APPLICATIONS

The present application is a continuation of U.S. application Ser. No. 10/024,531, filed Dec. 21, 2001, the entire contents of which are incorporated herein by reference.

This application is based upon and claims the benefit of priority from the prior Japanese Patent Applications No. 2000-388078 filed on Dec. 21, 2000, and No. 2001-240958 filed on Aug. 8, 2001, the entire contents of which are incorporated herein by reference.

BACKGROUND OF THE INVENTION

1. Field of the Invention

This invention relates to a chemical decontamination method and a treatment method and apparatus of chemical decontamination solution, and more particularly to a chemical decontamination method of dissolving an oxide film of a surface of a contaminated component, such as piping, instruments and components and a treatment method and apparatus of chemical decontamination solution in the decontamination process of dissolving the oxide film during or after the decontamination.

2. Description of the Related Art

In operation of a nuclear power plant, as an example of a radiation handling institutions, oxide film adheres or is generated in the inside of the piping, instruments, components, and the like, which are in contact with the fluid. If the fluid contains a radioactive material, for example, generated oxide film contains radionuclide. Therefore, a radiological dosage rises in the circumference of the piping or the instruments, which causes an increase of worker's dose of radioactivity at the time of the scheduled inspection work or the demolition work of the decommission of a nuclear reactor.

Several methods of removing the oxide film are known by now. In such methods, a method combining a process of oxidizing and dissolving chromium oxide in the oxide film by permanganic acid and a process of reducing and dissolving iron oxide which is a main component of the oxide film by oxalic acid is learned. The chemical decontamination method of dissolving and removing an oxide film chemically is enforced in a part of lately systems, which is much effective in reduction of radioactive material.

In order to remove such an oxide film, for example, the method of dissolving the oxide film or a metal base is used, in which method the oxide firm is made dissolved or exfoliated in solution.

In these decontamination methods, iron ions elute in the case of the reduction dissolution by oxalic acid. Since oxalic acid corrodes a metal base of carbon steel and stainless steel, a method of adjusting the valence and concentration of the iron ions ($Fe^{2+}$, $Fe^{3+}$) is learned in order to keep corrosion potential of the stainless steel in a passivation and suppress the corrosion.

The valance adjustment of the iron ion depends on a reaction shown in the following formulas that occurs by irradiating ultraviolet radiation into the oxalic acid, in which $Fe^{3+}$ is reduced to $Fe^{2+}$.

$$H_2O\text{->}e^-+O_2+H^+\text{->}HO_2\text{(radical)} \quad \text{(i)}$$

$$Fe^{3+}+HO_2\text{(radical)->}H^++O_2+Fe^{2+} \quad \text{(ii)}$$

Dissociating reduced $Fe^{2+}$ by a cation resin adjusts the concentration of the iron ion in the oxalic acid aqueous solution.

Moreover, as a decomposition method of the oxalic acid after decontamination of the oxalic acid, a decomposition method combining ultraviolet rays and hydrogen peroxide is learned.

Generation of $Fe^{2+}$: the formulas (i) and (ii) mentioned above Decomposition of oxalic acid:

$$H_2O_2+Fe^{2+}\text{->}Fe^{3+}+OH^-+OH\text{(radical)} \quad \text{(iii)}$$

$$H_2C_2O_4+2OH\text{(radical)->}2CO_2+2H_2O \quad \text{(iv)}$$

As the other decomposition method of oxalic acid, oxidation decomposition method by using the oxidization power of ozone is learned, and anodic oxidation decomposition method by electrolysis is also learned.

Moreover, a method of using ozone water as a decontamination solution that oxidizes and dissolves chromium oxide is also learned.

For example, Japanese Patent Disclosure (Kokai) No. S55-135800, which is equivalent to U.S. Pat. No. 4,287,002, shows a decontamination method combining an aqueous solution in which ozone gas was dissolved as an oxidizing agent, an organic acid, and decontamination solution of the oxidizing material. And Japanese Patent Disclosure (Kokai) No. H9-159798 shows a decontamination method sending decontamination solution with air bubbles generated by blowing ozone gas into a solution containing cellular material into a contaminated component.

Moreover, Japanese Patent Publication (Kokoku) No. H3-10919, which is equivalent to U.S. Pat. No. 4,756,768, indicates a chemical decontamination method using a permanganic acid as an oxidizing agent and using a dicarboxylic acid as a reducing agent. By using both the permanganic acid having high oxidization effect with low concentration and the dicarboxylic acid that can be decomposed into $CO_2$ and $H_2O$, it is possible to reduce the amount of secondary waste generated in this method compared with the chemistry decontamination method used till then.

Although the reduction of $Fe^{2+}$ by ultraviolet rays has abundant results of applying to actual systems as a treatment method of oxalic acid decontamination solution, there is a possibility that glass covered an ultraviolet ray lamp may be damaged by a foreign substance, and there is an awaiting solution of the fall of reduction efficiency caused by extraction of sludge, such as ferrous oxalate, deposited on the glass surface in the case treating aqueous solution with high salt concentration or prolonged use.

And the ultraviolet rays used in the oxalic acid decomposition also has the same subject as mentioned above, and there is a possibility of ignition when combustibles to which hydrogen peroxide adhered are left in the state as it is, so sufficient cautions for their handling are needed.

Moreover, by using the aqueous solution in which ozone gas is dissolved as an oxidizing agent, not only chromium oxide in the oxide film but also metal base of the contaminated component are oxidized and dissolved, which cannot secure the material soundness for re-use of the instruments and causes an awaiting solution.

Furthermore, the decomposition reaction of oxalic acid by using ozone independently is slow, and there is a subject in the decomposition by using electrolysis independently that the electric conductivity of the aqueous solution falls and the decomposition reaction suspends.

Moreover, by using the dicarboxylic acid as a reducing agent, the contaminated metal component for decontamination other than the oxide film is dissolved by acid, which cannot secure the material soundness for re-use of an instrument and causes an awaiting solution.

SUMMARY OF THE INVENTION

Accordingly, an object of this invention is to provide a chemical decontamination method which secures the material soundness by suppressing corrosion of a base metal of a contaminated component.

Another object of this invention is to provide a treatment method of chemical decontamination solution that can suppress corrosion of a metal base of a contaminated component by adjusting valance of iron ions in the chemical decontamination solution.

Still another object of this invention is to provide a treatment method and apparatus of chemical decontamination solution that can suppress corrosion of a metal base of a contaminated component by decomposing organic acid dissolved in the chemical decontamination solution certainly in a short time.

Additional purposes and advantages of the invention will be apparent to persons skilled in this field from the following description, or may be learned by practice of the invention.

According to an aspect of this invention, there is provided a chemical decontamination method of dissolving an oxide film of a surface of a contaminated component, including, preparing a first decontamination solution in which ozone is dissolved and an oxidation additive agent for suppressing corrosion of a metal base of the contaminated component is added; and applying the first decontamination solution to the contaminated component to remove by oxidation the oxide film of the surface of the contaminated component.

According to another aspect of this invention, there is provided a treatment method of chemical decontamination solution, including, preparing a chemical decontamination solution, in which organic acid is dissolved, for dissolving an oxide film of a surface of a contaminated component; and electrolyzing the chemical decontamination solution to reduce $Fe^{3+}$ ions in the chemical decontamination solution to $Fe^{2+}$ ions at a cathode and to oxidize $Fe^{2+}$ ions to $Fe^{3+}$ ions at a anode and to adjust the valance of iron ions in the chemical decontamination solution.

According to still another aspect of this invention, there is provided a treatment method of chemical decontamination solution, including, preparing a chemical decontamination solution, in which organic acid is dissolved, for dissolving oxide film of a surface of a contaminated component; electrolyzing the chemical decontamination solution to decompose the organic acid dissolved in the chemical decontamination solution at an anode; and adding ozone in the chemical decontamination solution to decompose the organic acid dissolved in the chemical decontamination solution.

According to still another aspect of this embodiment, there is provided a treatment apparatus including a decontamination bath to contain a contaminated component; and a circulation system into which a chemical decontamination solution flows and from which waste fluid drains after the decontamination; the circulation system having an electrolysis device to electrolyze the chemical decontamination solution, an ion exchange resin column to collect ions generated by the electrolysis device, and a dissolution mixer of ozone gas to dissolve ozone into the chemical decontamination solution, wherein the electrolysis device, the ion exchange resin and the dissolution mixer are connected in series from an outflow side of the circulation system to an inflow side of the circulation system.

BRIEF DESCRIPTION OF DRAWINGS

The accompanying drawings, which are incorporated in and constitute a part of this specification, illustrate several preferred embodiments of the invention and, together with the description, serve to explain the principles of this invention, wherein.

DETAILED DESCRIPTION OF THE INVENTION

Figure 1:
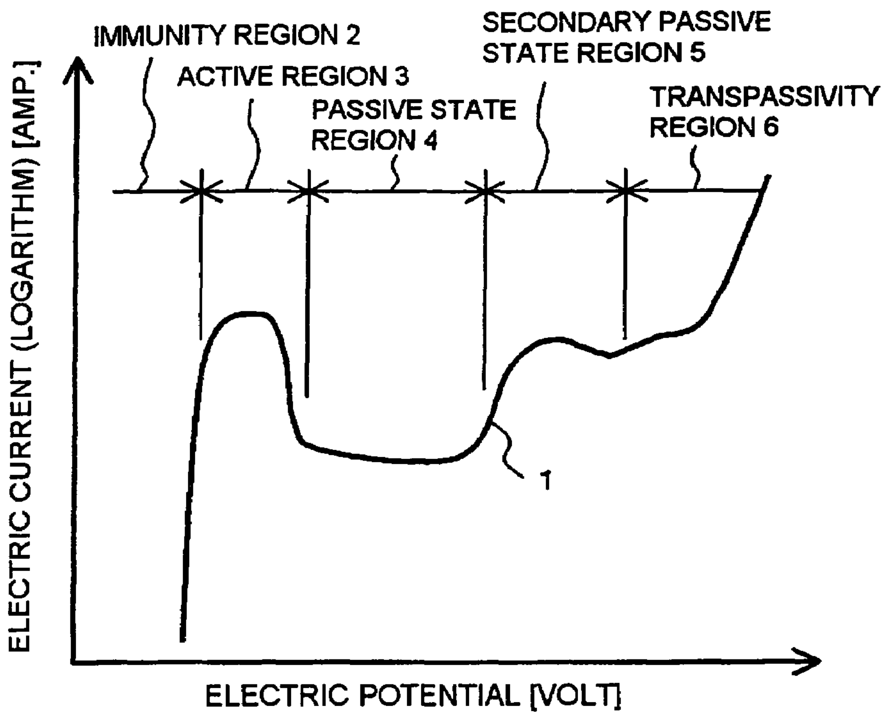
FIG. 1 is a polarization characteristics figure of corrosion potential of corrosion-resistant alloy in a third embodiment of this invention.

Chemical decontamination method and treatment method and apparatus of chemical decontamination solution of the present invention will now be specifically described in more detail with reference to the accompanying drawings. Wherever possible, the same reference numbers will be used throughout the drawings to refer to the same or like parts.

First Embodiment

A chemical decontamination method according to a first embodiment of this invention is explained.

The ozone that comes out of an ozonizer is a gas with oxidization power. The ozone dissolved in water is decomposed by a reaction as shown in the following formulas from (1) to (5) with generating various kinds of active oxygen.

$$O_3+OH^-\text{->}HO_2+O_2^- \quad (1)$$

$$O_3+HO_2\text{->}O_2+OH \quad (2)$$

$$O_3+OH\text{->}O_2+HO_2 \quad (3)$$

$$2HO_2 \rightarrow O_3+H_2O \quad (4)$$

$$HO_2+OH \rightarrow O_2+H_2O \quad (5)$$

As you know from the redox (reduction-oxidation) potential (v.s. NHE (normal hydrogen electrode)) of the following formulas from (6) to (9), the ozone and these kinds of active oxygen have strong oxidization power as compared with the permanganic-acid ion.

$$OH+H^++e^-=H_2O\ 2.81V \quad (6)$$

$$O_3+2H^++2e^-=O_2+H_2O\ 2.07V \quad (7)$$

$$HO_2+3H^++3e^-=2H_2O\ 1.7V \quad (8)$$

$$MnO_4^-+4H^++3e^-=MnO_2+2H_2O\ 1.7V \quad (9)$$

Among materials of the oxide films adhered to or generated onto the surfaces of piping and components of radiation handling facilities, for example, a nuclear power plant, the chromium oxide, which is hard to be dissolved, can be dissolved by the decontamination agent with oxidization power. Since ozone has oxidization power strong as mentioned above, it is applicable as a decontamination agent for oxidizing dissolution.

However, it is anxious that the ozone may corrode the metal base of stainless steel and a nickel alloy that are generally said to have corrosion resistance. To manufacture piping and instruments which touch the primary coolant of a nuclear power plant, SUS304, SUS316L, etc. are used as stainless steel, and Inconel 600 and Inconel 182 are used as a nickel radical alloy. In the case these materials are corroded by ozone solution, we are anxious about causing stress corrosion cracking in the re-use after decontamination.

Then, in this embodiment, coped with the above-mentioned concern, a method of suppressing the corrosion of the metal base by the ozone aqueous solution is explained according to four examples of this embodiment shown below.

First Example

First, in order to compare the corrosion suppression effect of the oxidation additive agent applied to a first example of this embodiment, the corrosion test result of material with the conventional decontamination solution is explained.

Namely, ozone is dissolved by the concentration of 7 ppm in a nitric acid aqueous solution of pH 3, and the corrosion test of SUS304 and Inconel 600 are performed on conditions with a temperature of 80 degrees Centigrade for 10 hours. That is, under this condition, the solution is applied to the specimen for 10 hours.

As a result of observing the material surface after this test, some intergranular corrosion was observed for both SUS304 and Inconel 600.

Thus, the ozone decontamination solution that has not taken the measures against the suppression of material corrosion can be applied to the decontamination of a used instrument that does not need to take material soundness into consideration, or the decontamination before demolition at the time of decommissioning of a nuclear reactor, when it is applied to decontamination of piping or components of radiation handling facilities, for example, a nuclear power plant.

However, there is possibility of starting stress corrosion cracking in the re-use after decontamination if the ozone decontamination solution is applied to re-use piping and components in which material soundness is needed.

Then, in this first example of the embodiment, nickel carbonate is selected as an oxidation additive agent that suppresses the corrosion caused by the ozone aqueous solution, and the effect is checked by experiment.

Ozone is dissolved by the concentration of 5 ppm in the aqueous solution in which nickel carbonate is dissolved by the concentration of 10 ppm, and corrosion test of SUS304 specimen is performed on conditions with the temperature of 80 degrees Centigrade for 10 hours. That is, under this condition, the solution is applied to the specimen for 10 hours.

As a result of observing the material surface after the test, intergranular, pitting, etc. are not observed on the surface of SUS304.

Since corrosion of the metal base of stainless steel can be suppressed by adding nickel carbonate as an oxidation additive agent in the ozone aqueous solution as mentioned above, the material soundness for re-use after decontamination is securable without occurring stress corrosion cracking by applying this decontamination solution to decontamination of piping and components used in a nuclear power plant.

Instead of the above-mentioned first example of this embodiment, by adding several 10 ppm of carbonate such as iron carbonate, potassium carbonate, and calcium carbonate, as an oxidation additive agent, the effect that is the same as that of the above-mentioned first example can be acquired.

Moreover, although we check the same effect is acquired by adding carbonic acid as an oxidation additive agent, in this case it is necessary to supply carbonic acid gas into the aqueous solution, which is similar to the generation of an ozone aqueous solution.

Furthermore, it is checked that hydrogencarbonate, such as nickel hydrogencarbonate, potassium hydrogencarbonate, calcium hydrogencarbonate, etc., also has the same effect.

Second Example

In a second example of this embodiment, boric acid is selected as an oxidation additive agent that suppresses corrosion caused by the ozone aqueous solution, and the effect is checked by experiment.

Ozone is dissolved by the concentration of 2 ppm in an aqueous solution in which boric acid is dissolved by the concentration of 50 ppm, and corrosion test of SUS304 specimen is performed on conditions with the temperature of 80 degrees Centigrade for 10 hours. That is, under this condition, the solution is applied to the specimen for 10 hours.

As a result of observing the material surface after this test, intergranular, pitting, etc. are not observed on the surface of SUS304.

Since corrosion of the metal base of stainless steel can be suppressed by adding boric acid as an oxidation additive agent in the ozone aqueous solution as mentioned above, the material soundness for the re-use after decontamination is securable by applying this decontamination solution to decontamination of piping and components used in a nuclear power plant.

Instead of the above-mentioned second example of the embodiment, by adding borate, such as boric-acid nickel and manganese borate, etc., as an oxidation additive agent by the concentration of several 10 ppm, the effect that is the same as that of the above-mentioned second example can be acquired.

Third Example

In a third example of this embodiment, sulfuric acid is selected as an oxidation additive agent that suppresses corrosion caused by the ozone aqueous solution, and the effect is checked by experiment.

Ozone is dissolved by the concentration of 5 ppm in an aqueous solution in which sulfuric acid is dissolved by the concentration of 30 ppm, and corrosion test of SUS304 specimen is performed on conditions with the temperature of 80 degrees Centigrade for 10 hours. That is, under this condition, the solution is applied to the specimen for 10 hours.

As a result of observing the material surface after the test, intergranular, pitting, etc. are not observed on the surface of SUS304.

Since corrosion of the metal base of stainless steel can be suppressed by adding sulfuric acid as an oxidation additive agent in the ozone aqueous solution as mentioned above, the material soundness for the re-use after decontamination is securable by applying this decontamination solution to decontamination of piping and components used in a nuclear power plant.

Instead of the above-mentioned third example of the embodiment, by adding sulfate such as iron sulfate, nickel sulfate, and manganese sulfate, etc., as an oxidation additive agent by the concentration of several 10 ppm, the effect that is the same as that of the above-mentioned third example can be acquired.

Fourth Example

In a fourth example of this embodiment, phosphoric acid is selected as an oxidation additive agent that suppresses corrosion caused by the ozone aqueous solution, and the effect is checked by experiment.

Ozone is dissolved by the concentration of 4 ppm in aqueous solution in which phosphoric acid is dissolved by the concentration of 40 ppm, and corrosion tests of SUS304 and Inconel 600 specimen are performed on conditions with the temperature of 90 degrees Centigrade for 10 hours. That is, under this condition, the solution is applied to the specimen for 10 hours.

As a result of observing the material surface after the test, intergranular, pitting, etc. are not observed on the surfaces of the SUS304 and Inconel 600.

Since corrosion of the metal base of stainless steel and nickel alloy can be suppressed by adding phosphoric acid as an oxidation additive agent in the ozone aqueous solution as mentioned above, the material soundness for the re-use after decontamination is securable by applying this decontamination solution to decontamination of piping and components used in a nuclear power plant.

Instead of the above-mentioned fourth example of this embodiment, by adding phosphate such as iron phosphate, nickel phosphate, potassium phosphate, calcium phosphate, and manganese phosphate, etc., as an oxidation additive agent by the concentration of several 10 ppm, the effect that is the same as that of the above-mentioned fourth example can be acquired.

Furthermore, it is checked by experiment that hydrogenphosphate, such as calcium hydrogenphosphate, potassium hydrogenphosphate, manganese hydrogenphosphate, etc., also has the same effect as mentioned above.

As explained above, it is preferable that the oxidation additive agent is at least one selected of the group consisting of carbonic acid, carbonate, hydrogencarbonate, boric acid, borate, sulfuric acid, sulfate, phosphoric acid, phosphate, and hydrogenphosphate. These materials are easy to dissolve into the aqueous solution in which ozone is dissolved, and by using these materials, decontamination work becomes easy and there is an effect which suppresses corrosion of the metal base of the contaminated component.

In the four examples from the first example to the fourth example, it is assumed that the reason why the oxidation additive agent added in the ozone aqueous solution suppresses corrosion of the metal base is based on a reaction with OH radical shown in the formulas through (10) to (14).

OH radical is a substance with a high possibility of corroding the metal base, because its redox potential is the highest of all of ozone and the active oxygen generated by decomposition of ozone.

It is assumed that the oxidation additive agent added in the ozone aqueous solution vanishes the oxidization power of OH radical by the reaction shown below, and the base-metal corrosion of a stainless steel and nickel radical alloy is suppressed.

$$\mathrm{OH(radical)+HCO_3^{-}\text{->}CO_3(radical)^{-}+H_2O} \quad (10)$$

$$\mathrm{OH(radical)+CO_3^{2-}\text{->}OH^{-}+CO_3(radical)^{-}} \quad (11)$$

$$\mathrm{OH(radical)+H_3BO_3\text{->}H_2O+H_2BO_3} \quad (12)$$

$$\mathrm{OH(radical)+HSO_4^{-}\text{->}SO_4(radical)^{-}+H_2O} \quad (13)$$

$$\mathrm{OH(radical)+H_3PO_4\text{->}H_2O+H_2PO_4(radical)} \quad (14)$$

Moreover, since phosphoric acid is effective to suppress corrosion of base metal by forming passivation film on the surface of the metal base, the above-mentioned oxidation additive agent can suppress corrosion of the base metal of stainless steel and nickel radical alloy by this action.

Second Embodiment

In a second embodiment of chemical decontamination method according to this invention, both an oxidization process of the oxide film by using the ozone aqueous solution in which an oxidation additive agent is added and a reduction process by using organic acid aqueous solution are carried out repeatedly to execute the decontamination experiment of stainless steel specimen (10×20×5$^t$ mm) contaminated with radioactive material as a contaminated component.

The experiment procedure is composed of several cycles. As a first cycle of decontamination, a reduction process by using oxalic acid aqueous solution (on condition with the oxalic acid concentration of 2000 ppm and the temperature of 95 degrees Centigrade) is performed for 5 hours.

Next, as a second cycle of decontamination, an oxidation process of oxide film by using ozone aqueous solution in which phosphoric acid is added by the concentration of 20 ppm (on condition with the ozone concentration of 3 ppm and the temperature of 80 degrees Centigrade) is performed for 2 hours, and afterward a reduction process by using oxalic acid aqueous solution (on condition with the oxalic acid concentration of 2000 ppm and the temperature of 95 degrees Centigrade) is performed for 5 hours.

Besides, as a third cycle of decontamination, an oxidation process of oxide film by using ozone aqueous solution in which phosphoric acid is added by the concentration of 20 ppm (on condition with the ozone concentration of 3 ppm and the temperature of 80 degrees Centigrade) is performed for 2 hours, and afterward a reduction process by using oxalic acid aqueous solution (on condition with the oxalic acid concentration of 2000 ppm and the temperature of 95 degrees Centigrade) is performed for 5 hours.

Here, in the reduction process of the oxide film of the surface of stainless steel, mainly containing radioactive material, by using oxalic acid [$(COOH)_2$], iron oxide which is the principal component of the oxide film dissolves as shown in following formula (15). And in the oxidation process of the oxide film by using ozone water, chromium oxide ($Cr_2O_3$) dissolves by the reaction as shown in following formulas (16) and (17).

$$Fe_2O_3+(COOH)_2+4H^+\text{->}2Fe^{2+}+3H_2O+2CO_2 \quad (15)$$

$$Cr_2O_3+3O_3+2H_2O\text{->}2CrO_4^{2-}+4H^++3O_2 \quad (16)$$

$$Cr_2O_3+2O_3+H_2O\text{->}Cr_2O_4^{2-}+2H^++3O_2 \quad (17)$$

The amount of the radioactive substance of the specimen measured before the experiment by a germanium semiconductor gamma ray spectrometer is of almost 100% over 99% removed, which is admitted by measuring the amount of the radioactive material after the experiment.

Thus, since this embodiment has not only useful effect caused by the reduction process but also sufficient decontamination performance even if an oxidation additive agent which functions as a corrosion inhibitor of the metal base, for example, phosphoric acid, is added in ozone water, this method is applicable to decontamination of the radioactive material adhering to piping, instruments, components, and the like, used in a nuclear power plant.

Third Embodiment

A third embodiment of chemical decontamination method of this invention relates to how to suppress corrosion of the metal base in the reduction process by the oxalic acid in the above-mentioned second embodiment.

Anode polarization characteristics in the acid of stainless steel are shown as a polarization curve 1 in FIG. 1.

This polarization curve 1 expresses corrosion characteristics in the solution of a metal substance and electric current which flows when it holds to a certain electric potential, in which the vertical axis denotes a logarithm value of the electric current and the horizontal axis denotes electric potential. In this chart, the larger the electric current is, the larger the elution amount by the corrosion is and the less the corrosion resistance becomes.

In the case of structural material with high corrosion resistance, such as stainless steel or a nickel alloy, corrosion characteristics change with electric potential, divided into an immunity region 2, an active region 3, a passive state region 4, a secondary passive state region 5, and a transpassivity region 6, from the lower electric potential side.

In the immunity region 2 or the passive region 4, the electric current is lower, thus the corrosion amount is less.

However, since corrosion potential of stainless steel in the oxalic acid solution is in the active region 3, it is known that the metal base of stainless steel is corroded by oxalic acid.

Accordingly, to avoid the corrosion, there is a method of raising and holding the corrosion potential of stainless steel to the passive state region 4 by adding $Fe^{3+}$ ions to the oxalic acid solution.

In order to make a Fe ion exist as a $Fe^{3+}$ ion in the oxalic acid solution, the simplest and the most certain method is adding diiron trioxide ($Fe_2O_3$) or triiron tetraoxide ($Fe_3O_4$) which are generally marketed into the oxalic acid aqueous solution.

Then, in this embodiment, by adding the diiron tetraoxide or the triiron tetraoxide and soaking the stainless steel specimen in the oxalic acid solution, continuous measurement of the amount of Fe ion in each oxalic acid solution and observation on the surface of the stainless steel are performed.

The condition of the experiment is that the oxalic acid is dissolved by the concentration of 2000 ppm in the aqueous solution with the temperature of 95 degrees Centigrade, in which the powder of triiron tetraoxide and the powder of diiron tetraoxide are added, respectively, and SUS304 specimen is immersed into the solution for 3 hours.

Figure 2:
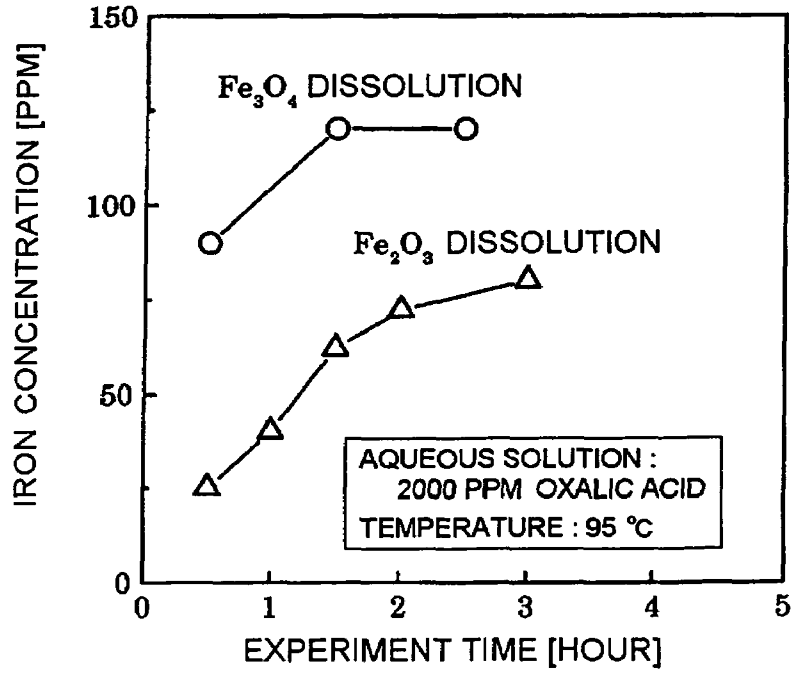
FIG. 2 is a characteristics figure showing dissolution aging of diiron trioxide and a triiron tetraoxide in the third embodiment of this invention.

Aging of the iron concentration in the oxalic acid aqueous solution is shown in FIG. 2. The vertical axis in the figure shows concentration of iron ions, and the horizontal axis shows experiment time.

The triiron tetraoxide ($Fe_3O_4$) powder has quick dissolution rate and its concentration becomes fixed about 120 ppm for 1.5 hours, but the diiron trioxide ($Fe_2O_3$) dissolves gradually and dissolves only about 80 ppm for at least 3 hours.

Next, as a result of performing surface observation of SUS304 specimen taken out from the oxalic acid aqueous solution, although there is intergranular of the SUS304 specimen taken out from the oxalic acid aqueous solution in which the diiron tetraoxide powder is added, change is hardly recognized in SUS304 specimen taken out from the oxalic acid aqueous solution in which the triiron tetraoxide powder is added.

It is considered because the diiron trioxide has a slow dissolution rate and thus requires much time until the corrosion potential of SUS304 specimen goes up from the active region to the passive state region, and in the meantime the SUS304 specimen corroded.

According to this embodiment, since corrosion of the stainless steel and a nickel alloy caused by oxalic acid is suppressed by adding triiron tetraoxide powder in the oxalic acid aqueous solution as a reduction additive agent, corrosion of the metal base of piping, instruments, components, etc., which are used in a nuclear power facilities, can be suppressed and the material soundness after decontamination can be secured without occurring intergranular.

Fourth Embodiment

Figure 3:
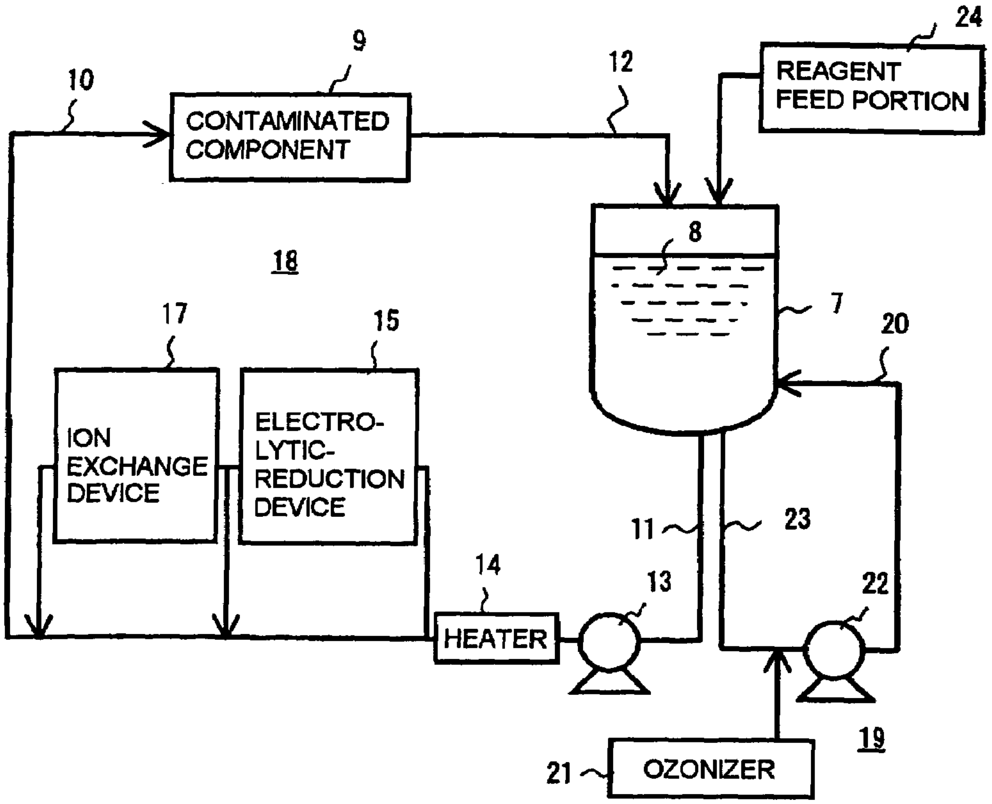
FIG. 3 is a flow diagram for explaining chemical decontamination apparatus applied to a fourth embodiment of this invention.

Next, as a fourth embodiment of this invention, an example of a chemical decontamination apparatus as shown in FIG. 3 in order to decontaminate in each above-mentioned embodiment of this invention.

In FIG. 3, a buffer tank 7 is arranged for storing decontamination solution 8, and the decontamination solution circulatory system 10 is connected to the buffer tank 7 in order to send the decontamination solution 8 to a contaminated component 9 to decontaminate and return the used decontamination solution 8 to the buffer tank 7 after decontamination.

The decontamination solution circulatory system 10 is composed of a decontamination solution outflow piping 11 for discharging the decontamination solution 8 out of the bottom of the buffer tank 7 and a decontamination solution return piping 12 for flowing the decontamination solution 8 through the inside of the contaminated component 9 to decontaminate and returning the used decontamination solution 8 after decontamination into the buffer tank 7 from the upper end of the buffer tank 7. Moreover, a circulatory pump 13 for circulating the decontamination solution 8 and a heater 14 is connected to decontamination solution outflow piping 11 in sequence, and a decontamination solution purification system 18 equipped with a electrolytic-reduction device 15 and an ion exchange device 17 is connected to bypass the decontamination solution outflow piping 11 between the heater 14 and the contaminated component 9.

Moreover, an ozone pouring system 19 is connected to the buffer tank 7. The ozone pouring system 19 is composed of a connection pipe 23, an ozonizer 21, a mixing pump 22, and an ozone water charging pipe 20. The connection pipe 23 connects the bottom of the buffer tank 7 and the absorption side of the mixing pump 22.

In addition, the reagent feed portion 24 that supplies the above-mentioned reagent of an oxidation additive agent or a reduction additive agent into the buffer tank 7 is connected to the upper end of the buffer tank 7.

Next, an example of operation of the chemical decontamination apparatus with the above-mentioned composition is explained.

The reagent feed portion 24 provides the oxalic acid decontamination solution 8, in which triiron tetraoxide is dissolved by the concentration of 120 ppm (converted to iron concentration) as a reduction additive reagent which functions as a corrosion inhibitor of the metal base to the contaminated component 9 from the buffer tank 7 through the decontamination solution circulatory system 10 by the circulatory pump 13.

As the heater 14 heats the oxalic acid decontamination solution up to a predetermined temperature, the contaminated component 9 is decontaminated for a predetermined period.

Iron oxide in the oxide film containing radioactive substance of the surface of the contaminated component 9 is dissolved by oxalic acid according to the reaction shown as the formula (15).

Moreover, cations, such as $Fe^{2+}$ ions, Co ions, etc., as radionuclide that elutes in the decontamination solution 8, are separated and recovered by cation resin of the ion exchange device 17.

On the other hand, $Fe^{3+}$ ions are also intermingled in the oxalic acid solution and form complexes $[Fe((COO)_2)_3]^{3-}$ with oxalic acid.

Since these complexes cannot be separated and collected by the cation resin, they exist as being dissolved into the oxalic acid aqueous solution.

Then, direct-current voltage is given to an anode and a cathode (in condition with their area ratio of 1:10) of the electrolytic-reduction device 15 by a direct current power source (not shown) after the end of decontamination of the oxalic acid, and a $Fe^{3+}$ ion of oxalic acid complex $[Fe((COO)_2)_3]^{3-}$ is reduced to a $Fe^{2+}$ ion at the cathode. The reduced $Fe^{2+}$ ion is separable by the cation resin.

In addition, it is possible to set a UV (ultraviolet rays) irradiation device in the decontamination solution purification system 18 between the electrolytic-reduction device 15 and the ion exchange device 17. In this case, oxalic acid remaining in the decontamination solution 8 is decomposed into water and carbonic acid gas by irradiating ultraviolet rays from the UV irradiation device together with supplying hydrogen peroxide from the reagent feed portion 24.

Fifth Embodiment

A fifth embodiment of this invention relates to as a treatment method of chemical decontamination solution, characterized in a method of reducing a $Fe^{3+}$ ion that forms a complex with oxalic acid to a $Fe^{2+}$ ion that is separated and collected by a cation resin by performing an electrolytic reduction.

Figure 4:
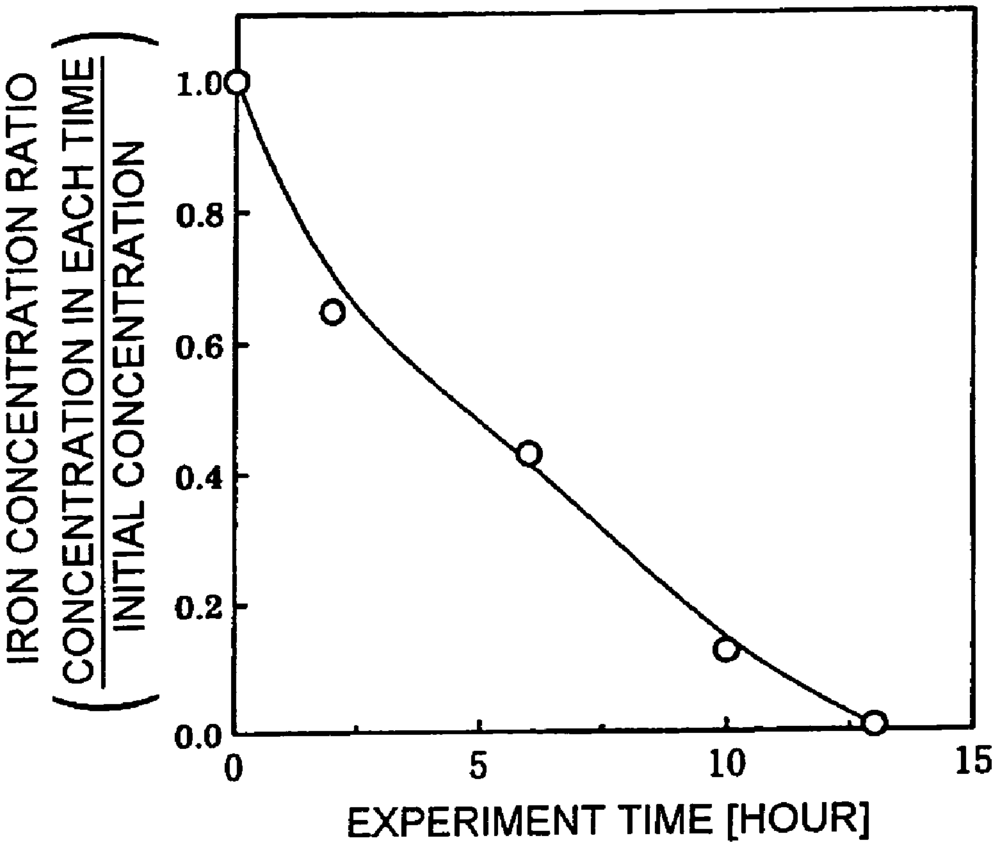
FIG. 4 is a curvilinear figure for explaining the effect of electrolytic reduction in a fifth embodiment of this invention.

In order to check the effect of the electrolytic reduction, aging of iron concentration in the oxalic acid solution is measured and the measurement result is shown in FIG. 4.

While 10 V of the direct-current voltage is given between the anode and the cathode of the electrolytic-reduction device 15 shown in FIG. 3, the iron concentration is measured by sampling oxalic acid aqueous solution passed from the ion exchange device 17 at predetermined regular intervals.

The vertical axis in FIG. 4 denotes the iron concentration ratio (concentration in each time/initial concentration), and the horizontal axis denotes time (hour).

For 13 hours of the electrolytic-reduction, most of the iron dissolved in the oxalic acid solution is reduced to $Fe^{2+}$ and dissociated by the cation resin.

Thus, the ion exchange device 17 can dissociate most of iron ions that elute in the oxalic acid solution.

The generating amount of ion exchange resin is measured and compared in the case where the cation resin dissociates and collects $Fe^{2+}$ ions to which $Fe^{3+}$ ions are reduced by electrolytic reduction in this embodiment and in the case where the anion resin dissociates and collects $Fe^{3+}$ ions of complexes $[Fe((COO)_2)_3]^{3-}$, based on the ion exchange resin (cation resin: 1.9 eq/liter, anion resin: 1.1 eq/liter) usually used in the nuclear power plant.

Suppose that Fe ions dissolves by the concentration of 100 ppm in 100 $m^3$ of oxalic acid aqueous solution, in the former case, 190 liter of the cation resin used in dissociation and collection of $Fe^{2+}$ ions is generated. On the other hand, in the latter case, 490 liter of the anion resin used in dissociation and collection of complexes $[Fe((COO)_2)_3]^{3-}$ is generated.

Thus, reducing $Fe^{3+}$ ions to $Fe^{2+}$ by the electrolytic reduction makes about 60% cut down of the amount of the used ion exchange resin.

As mentioned above, since the cation exchange resin can dissociate $Fe^{3+}$ ions of oxalic acid complex $[Fe((COO)_2)_3]^{3-}$ by reducing to $Fe^{2+}$ ions by electrolytic reduction, and moreover oxalic acid can be decomposed into carbonic acid gas and water, therefore it is possible to cut down the generating amount of secondary waste as compared with the case where oxalic acid complex $[Fe((COO)_2)_3]^{3-}$ is separated and collected by the anion exchange resin.

Next, the solution is converted to acidic solution by adding phosphoric acid by the concentration of 20 ppm as a oxidation additive agent which functions as a corrosion inhibitor of the metal base from the reagent feed portion 24, and the decontamination solution 8 for use of oxidation treatment by ozone is made by supplying the ozone gas occurred from the ozonizer 21 into the buffer tank 7 from the mixing pump 22 through the ozone water charging pipe 20.

This decontamination solution 8 is supplied to the contaminated component 9 by the circulatory pump 13 through the decontamination solution outflow piping 11.

The decontamination solution 8 is heated up to predetermined temperature by the heater 14, and while the decontamination is performed for a predetermined period, the reaction shown in the reaction formulas (16) and (17) mentioned above occurs, and the chromic acid in the oxide film of the surface of the contaminated component 9 containing the radioactive substance is oxidized and dissolved.

After the decontamination, phosphoric acid ions ($PO_4^{3-}$) added as an oxidation additive agent and chromic acid ions ($CrO_4^{2-}$, $Cr_2O_4^{2-}$) as eluted metal are dissociated and collected by the anion resin of the ion exchange device 17.

In addition, while phosphate, such as calcium phosphate, etc., is added as the other oxidation additive agent instead of the case mentioned above, or while hydrogenphosphate, such as calcium hydrogenphosphate, etc., is added, its salts, namely calcium ions, are dissociated and collected by the cation resin of the ion exchange portion 17.

Similarly, boric acid and sulfuric acid are dissociated and collected by the anion resin, and those salts are dissociated and collected by the cation resin.

Moreover, salts of carbonate and hydrogencarbonate are dissociated and collected by the cation resin, and the carbolic acid is discharged to a gaseous phase as gas.

Sixth Embodiment

The sixth embodiment of this invention concerns treating method of chemical decontamination solution, which is explained by using FIG. 1 through FIG. 4.

Figure 5:
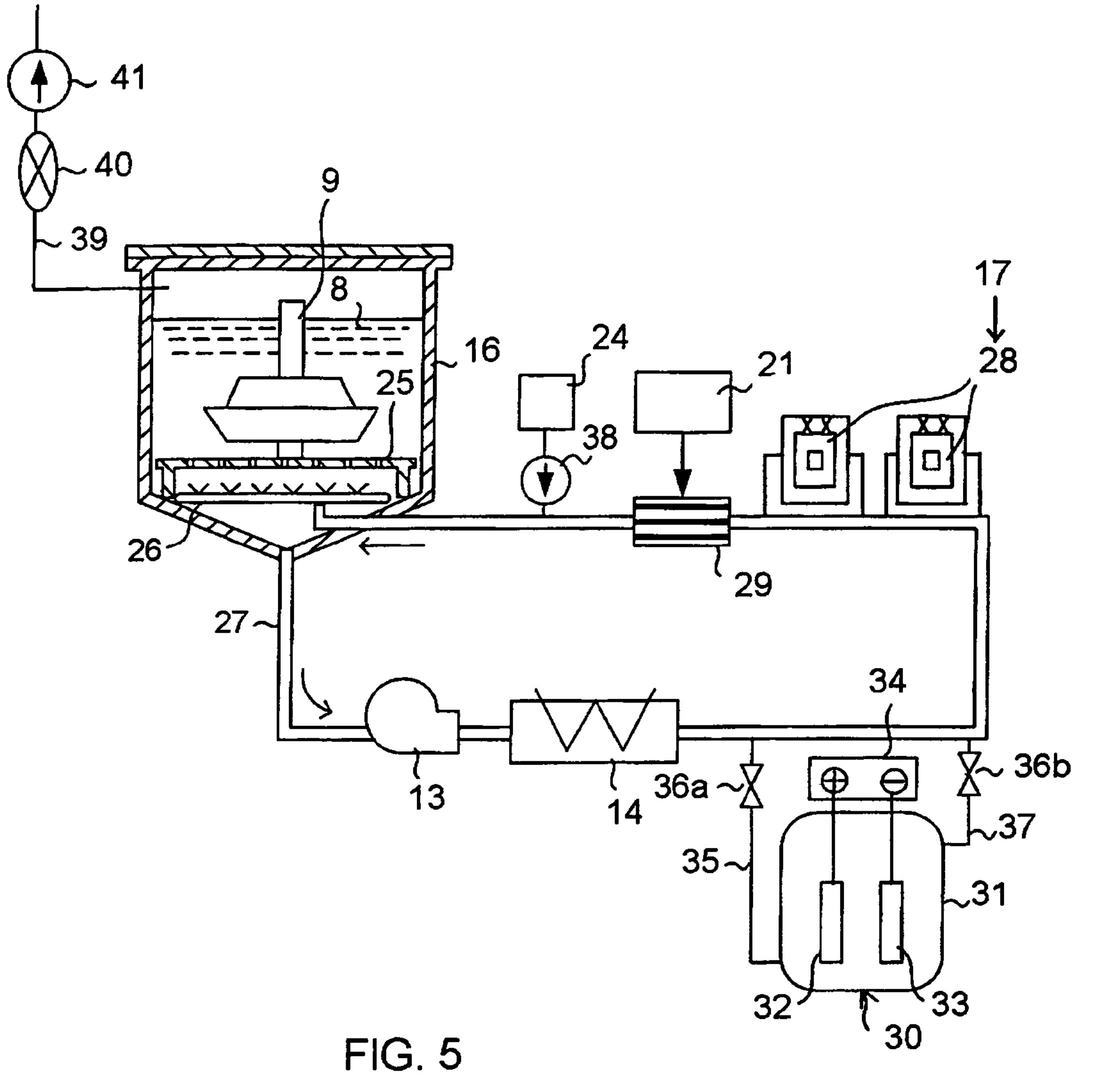
FIG. 5 is a flow diagram for explaining treatment method and apparatus of chemical decontamination solution applied to a sixth embodiment of this invention.

FIG. 5 is a flow diagram explaining a chemical decontamination apparatus applied to this embodiment.

In FIG. 5, reference number 16 designates a decontamination bath containing a contaminated component 9 and chemical decontamination solution 8 is filled in the decontamination bath 16, where a contaminated component 9 is immersed into the chemical decontamination solution 8 and fixed on an installation stand 25 in the decontamination bath 16.

Injection nozzles 26 that inject the chemical decontamination solution 8 are attached below the installation stand 25 between the installation stand 25 and the bottom of the decontamination bath 16, and a circulatory system 27 of the chemical decontamination solution is formed between the injection nozzles 26 and the bottom of the decontamination bath 16.

The circulatory system 27 is composed of a circulatory pump 13, a heater 14, an electrolysis device 30, and ion exchange device 17 having ion exchange resin columns 28, a mixer 29, and reagent feed portion 24, in sequence from the bottom of the decontamination bath 16 toward the injection nozzle 26.

The electrolysis device 30 has a cell 31 and an anode 32, a cathode 33 and a direct current power source 34, which are arranged in the cell 31, and the cell 31 bypasses the circulation system 27 with an inflow pipe 35 having an entrance valve 36*a* and an outflow pipe 37 having an exit valve 36*b*.

A mixer 29 arranged in the downstream of the ion exchange device 17 in the circulatory system 27 is an ozone gas dissolution mixer connected to a ozonizer 21.

A pouring pump 38 is connected to reagent feed portion 24.

An exhaust pipe 39 connects with the upside of the decontamination bath 16 as an exhaust gas exhaust system, and the exhaust pipe 39 has in-series connection of a splitting column 40 and an exhaust blower 41.

Here, assuming that the chemical decontamination solution 8 is composed of oxalic acid aqueous solution containing oxalic acid as an organic acid, it is explained below as an example.

The oxalic acid decontamination solution 8 circulates through the circulatory system 27 composed of the circulatory pump 13, the heater 14, the electrolysis device 30, the ion exchange device 17, the mixer 29, and the reagent feed portion 24, and is returned to the decontamination bath 16.

In carrying out the reduction and dissolution of oxide film of surface of the contaminated component 9, oxalic acid aqueous solution is supplied to the decontamination bath 16 through the pouring pump 38 from reagent feed portion 24.

Valence adjustment of iron ions that elute in the oxalic acid decontamination solution 8 is made by giving direct-current voltage to the anode 32 and the cathode 33 of the cell 31 which is the main part of the electrolysis device 30, and the cathode 33 reduces $Fe^{3+}$ to $Fe^{2+}$ and the anode 32 oxidizes $Fe^{2+}$ to $Fe^{3+}$.

The oxalic acid of the aqueous solution after the reduction decontamination is decomposed into carbonic acid gas and water by supplying direct-current voltage to the anode 32 and the cathode 33 of the cell 31 from the direct current power source 34 and ozone gas from the ozonizer 21 to the mixer 29.

Moreover, metal ions dissolved into the decontamination solution 8 are removed in the ion exchange resin columns 28 of the ion exchange portion 17.

In carrying out oxidizing dissolving of the oxide film, ozone gas is supplied to the mixer 29 from the ozonizer 21, and ozone water is generated and supplied to the decontamination bath 16.

The ozone gas discharged from the decontamination bath 16 is drawn in by the exhaust blower 41 through the exhaust pipe 39 and decomposed in the splitting column 40, and is discharged to the exhaust system.

Figure 6:
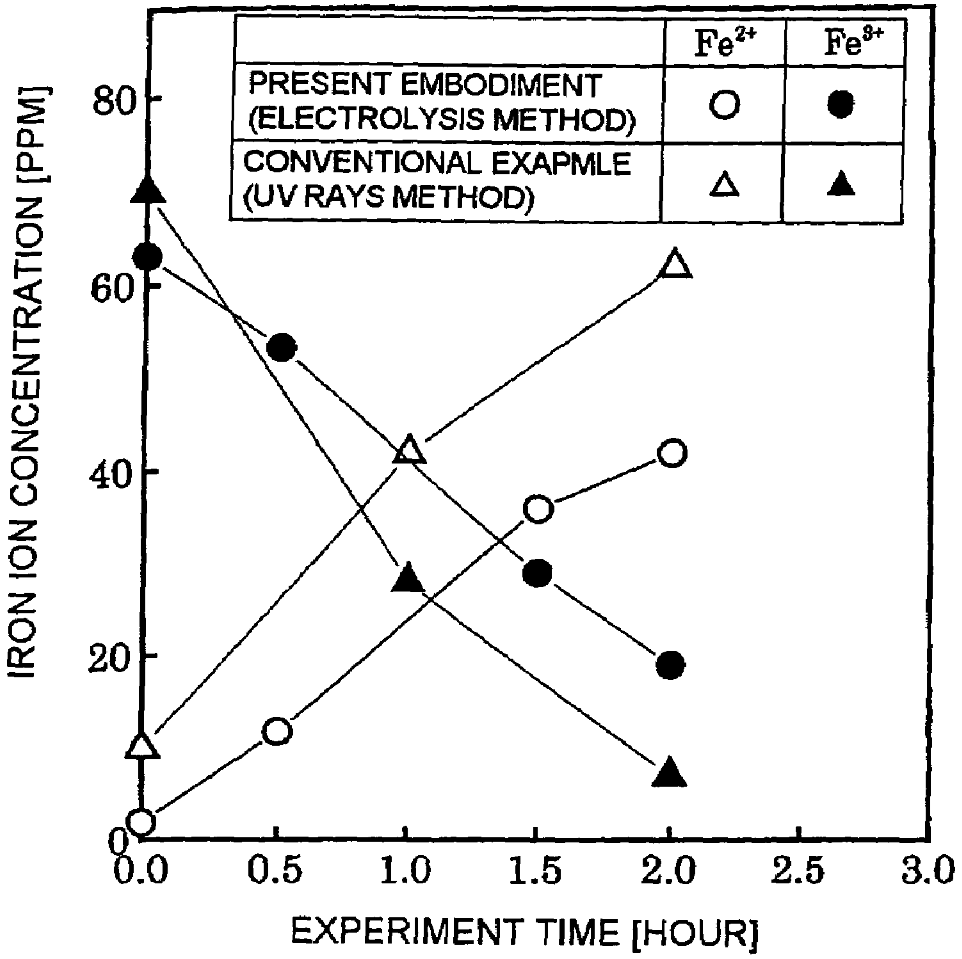
FIG. 6 is a characteristics figure comparing and showing the relation between the iron ion concentration and the experiment period of the sixth embodiment of this invention and conventional method.

Next, the experiment result of valence adjustment of iron ions in the oxalic acid aqueous solution is explained with reference to FIG. 6. FIG. 6 shows the experiment result of the electrolytic process of this embodiment in this invention and that of the ultraviolet rays method of the conventional example.

The experiment condition of the electrolytic process as follows: the area ratio of the cathode area to the anode area is 5, the current density to the cathode area is 3.5 $A/m^2$, and the injected electric power is 300 $W/m^3$.

The experiment condition of the conventional ultraviolet rays method is that the injected electric power is 600 $W/m^3$.

The vertical axis in the figure shows concentration of $Fe^{2+}$ or $Fe^{3+}$, and the horizontal axis shows experiment time.

$Fe^{3+}$ is decreased along the increase in $Fe^{2+}$ concentration in both this invention and the conventional example; the increase velocity of $Fe^{2+}$ concentration is 20 ppm/h in this invention and is 26 ppm/h in the conventional example.

Though the reduction velocity of iron of this embodiment is a little inferior to that of the conventional example, the amount of injected electric power of this embodiment is half of that of the conventional example, therefore it is clearly admitted that by using the electrolytic process of this embodiment $Fe^{3+}$ can be reduced to $Fe^{2+}$ efficiently and corrosion of base metal of carbon steel can be suppressed. Since $Fe^{2+}$ ions are separable at a cation resin, this embodiment enables to perform desalination and purification treatment of the organic acid aqueous solution easily.

Moreover, since corrosion of stainless steel components takes place by electronegative potential, corrosion of the metal base of the stainless steel can be suppressed by oxidizing $Fe^{2+}$ to $Fe^{3+}$ at the anode and raising the electric potential of oxalic acid aqueous solution.

Figure 7:
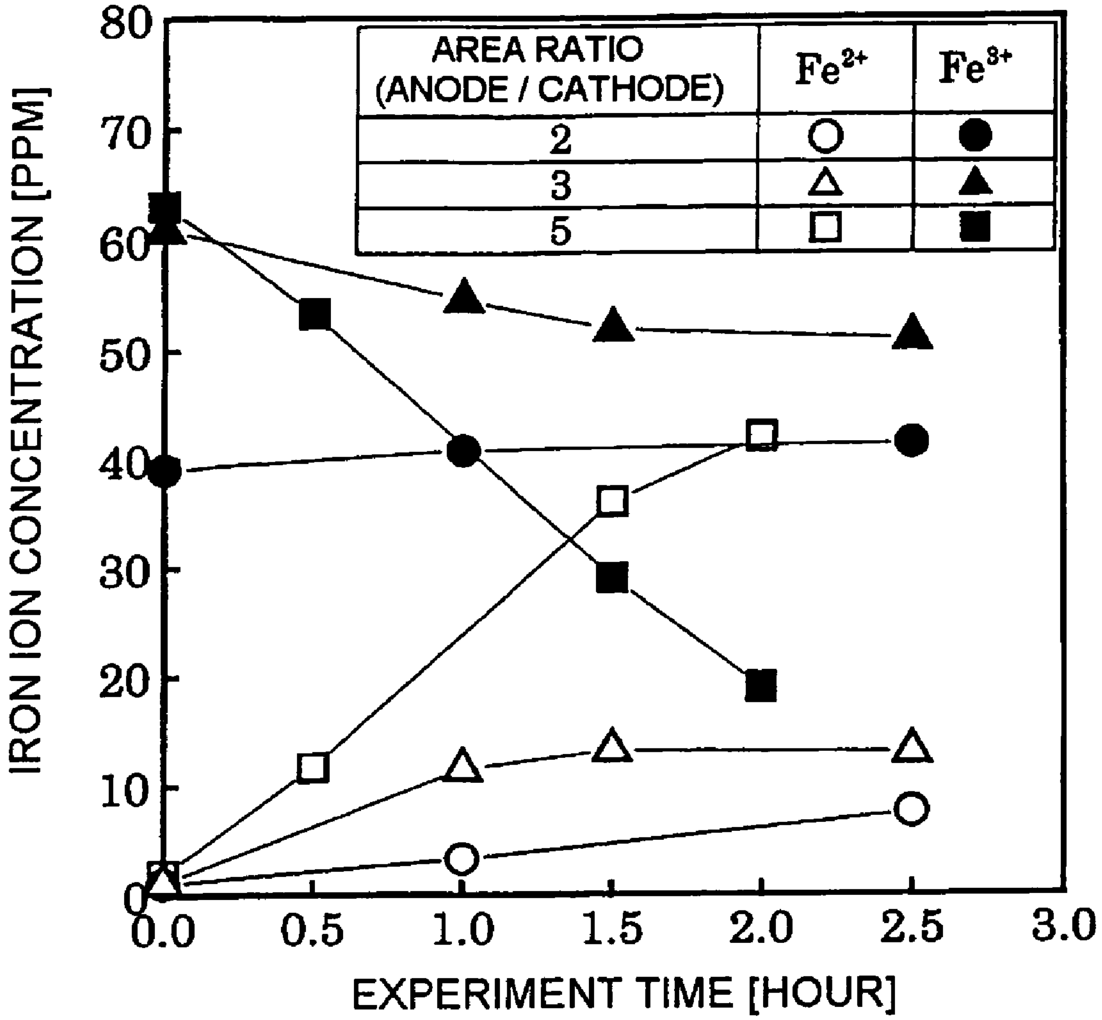
FIG. 7 is a characteristics figure for similarly explaining effect of area ratio of a cathode and an anode of an electrolysis device.

Next, the influence of the area ratio of the cathode area to the anode area in the electrolytic process of this embodiment is explained with reference to FIG. 7.

The vertical axis in the figure shows concentration of $Fe^{2+}$ or $Fe^{3+}$, and the horizontal axis shows experiment time.

The experiment condition is that the cathode/anode area ratio of two is shown by circled marks, the cathode/anode area ratio of three is shown by triangular marks, and the cathode/anode area ratio of five is shown by square marks.

Since each electrolysis experiment is carrying out with the same electric current value, the current density to the cathode area is 110 $A/m^2$ in the area ratio 2, 52 $A/m^2$ in the area ratio 3, and 35 $A/m^2$ in the area ratio 5.

Generation of $Fe^{2+}$ is hardly accepted in the area ratio 2, but generation of $Fe^{2+}$ is gradually accepted in the area ratio 3, and generation of $Fe^{2+}$ is accepted mostly in proportion to the experiment time in the area ratio 5.

Reduction reaction of $Fe^{3+}$ shown in the formula (18) occurs at the cathode and the oxidation reaction of $Fe^{2+}$ shown in the formula (19) at the anode.

$$\text{Cathode: } Fe^{3+} \text{->} Fe^{2+} + e^- \quad (18)$$

Anode: $Fe^{2+}+e^{-}->Fe^{3+}$ (19)

Since the generation amount of $Fe^{3+}$ increases if the anode area becomes large, it is considered that if the cathode/anode area ratio becomes small, the generation rate of $Fe^{2+}$ becomes slow.

It is admitted by the result of this experiment result that three or more are desirable as for the cathode/anode area ratio. Moreover, by setting the cathode/anode area ratio too large it needs considerable high electric voltage to keep a certain amount of electric current. Therefore it is more preferable to set the cathode/anode area ratio in the range between 3 and 10.

Moreover, on the contrary, there is a method of dissolving iron oxide (diiron trioxide, triiron tetraoxide) in the oxalic acid in order to make the concentration of $Fe^{3+}$ increase to suppress corrosion of metal base of the stainless steel by the oxalic acid.

In this method, it takes time to dissolve the iron oxide, and the amount of secondary wastes increases because of additionally adding iron oxide.

However, in the electrolytic process of this embodiment, since reversing the polarity of the direct current power source can enlarge the anode area, $Fe^{2+}$ can be easily oxidized to $Fe^{3+}$.

In order to reduce the $Fe^{3+}$ to $Fe^{2+}$ by electrolysis, the condition that a cathode area is larger than an anode area is effective. On the other hand, conversely in order to oxidize $Fe^{2+}$ to $Fe^{+}$, the condition that a cathode area is smaller than an anode area is effective. Moreover, in order to decompose oxalic acid, since the decomposition takes place at the anode, the condition that the cathode area is smaller than the anode area is effective. Therefore, by changing the polarity of the direct current power source according to target reactant, several desirable effects can be easily obtained by using single common electrolysis device.

Therefore, the electrolytic process of this embodiment can generate $Fe^{2+}$ and $Fe^{3+}$ in a short time without making the amount of secondary wastes increase and can suppress the metal base corrosion of stainless steel and carbon steel certainly.

In addition, if it electrolyzes during oxalic acid decontamination, the oxalic acid is oxidized and decomposed at the anode, and oxalic acid concentration decreases.

Since decontamination performance is influenced by the oxalic acid concentration, it is desirable to measure the oxalic acid concentration and add oxalic acid to a certain degree that is equivalent to the decrease in its concentration during decontamination.

Figure 8:
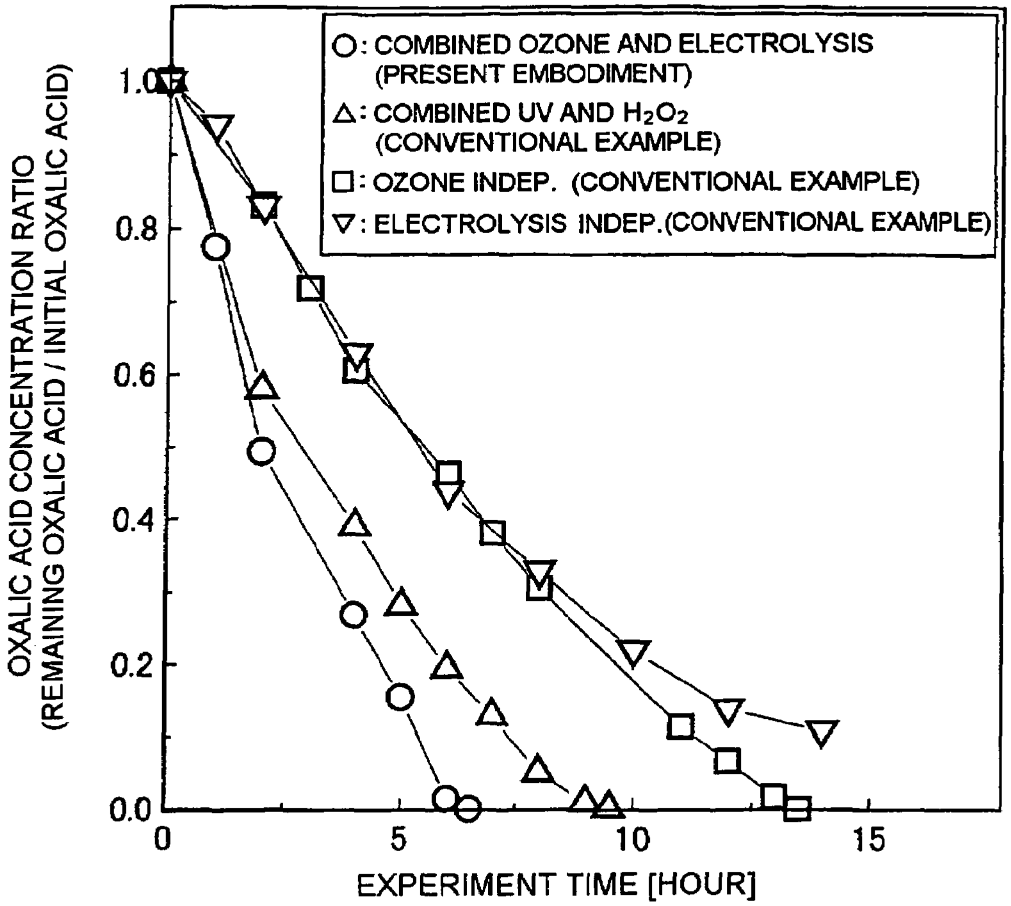
FIG. 8 is a characteristics figure for similarly explaining effect of oxalic acid decomposition.

Next the experiment result of the decomposition of the oxalic acid according to this embodiment of the invention is explained with reference to FIG. 8.

The vertical axis in this figure shows experiment time, and the horizontal axis shows ratio of the remains oxalic acid concentration at arbitrary time to the initial oxalic acid concentration [remains oxalic acid concentration/initial oxalic acid concentration].

The experiment result of the decomposition of the oxalic acid is shown by circle marks in the combined use of the electrolysis and ozone of this embodiment in this invention, shown by triangular marks in the combined use of the ultraviolet radiation and hydrogen peroxide of a conventional example, shown by square marks in the use of ozone independently of a conventional example, and shown by reversed triangular marks in the use of the electrolysis independently of a conventional example, respectively.

The experiment condition is as follows. In the electrolysis of this embodiment designated by circle marks, the current density to the anode area is 200 $A/m^2$, the amount of injection electric power is 260 $W/m^3$, and the supply amount of ozone gas is 1.5 g/h.

In the conventional example designated by triangular marks, the electric power of injected ultraviolet rays is 2500 $W/m^3$ and the adding amount of hydrogen peroxide is double equivalent to the oxalic acid concentration.

The supply amount of ozone gas is 1.5 g/h in the conventional example designated by square marks, and the current density to the anode area is 200 A $m^2$ in the conventional example designated reversed triangular marks.

In the combined use of ozone and the electrolysis of this embodiment in the invention, the oxalic acid concentration ratio decreases to 0.005 or less for 6.5 hours. Namely, if the initial oxalic acid concentration is 2000 ppm, this embodiment enables to decompose oxalic acid and decrease the oxalic acid concentration to 10 ppm or less for 6.5 hours.

In order to have decomposed oxalic acid up to 10 ppm or less of its concentration in the same condition as above-mentioned, the conventional combined use of ultraviolet rays and hydrogen peroxide needs 9.5 hours, and the conventional independent use of ozone needs 12 hours.

Moreover, in the conventional independent use of the electrolysis, oxalic acid still remains by concentration of several hundreds of ppm in the solution for as much as 14 hours, and even if the electrolysis is continued further, the advanced tendency for decomposition reaction is hardly accepted.

As mentioned above, the oxalic acid decomposition method of this embodiment by combining use of the electrolysis and ozone enables to decompose the oxalic acid in order to decrease the oxalic acid concentration into 10 ppm or less in a short time as compared with the conventional methods.

Therefore, this embodiment of the invention enables to shorten time necessary for completion of decontamination construction, and further secures safety of the decontamination construction because hydrogen peroxide is not needed. Namely, since decomposition of organic acid after the organic acid decontamination can be performed in a short time without adding a special medicine, the necessary period of the decontamination can be shortened, and moreover, safety can be secured.

In addition, the valence adjustment of iron ions in the oxalic acid aqueous solution and the decomposition of the oxalic acid by electrolysis can share a single electrolysis cell by reversing the polarity of the direct current power source.

Thereby, since the anode area can be enlarged at the time of oxalic acid decomposition, it can decompose oxalic acid efficiently.

In this embodiment, the decomposition additive agent used as a corrosion inhibitor for suppressing corrosion of the stainless steel in contact with the ozone water is chosen at least one from the group consisting of carbonic acid, carbonate, hydrogencarbonate, boric acid, borate, sulfuric acid, sulfate, phosphoric acid, phosphate, and hydrogenphosphate.

By using this decomposition additive agent, since ozone gas is supplied at the decomposition of oxalic acid, it checked that there is effect of suppressing corrosion of metal base of the stainless steel during the decomposition treatment of the oxalic acid.

Next, an example of the concrete composition of the electrolysis device 30 shown in FIG. 1 is explained with reference to FIG. 9 through FIGS. 12A and 12B.

Figure 9:
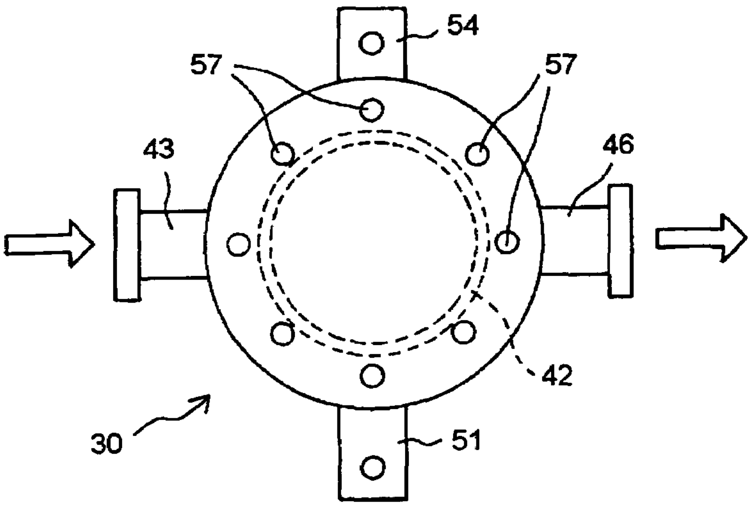
FIG. 9 is a upper view showing an example of the electrolysis device applied to the sixth embodiment of the invention.
Figure 10:
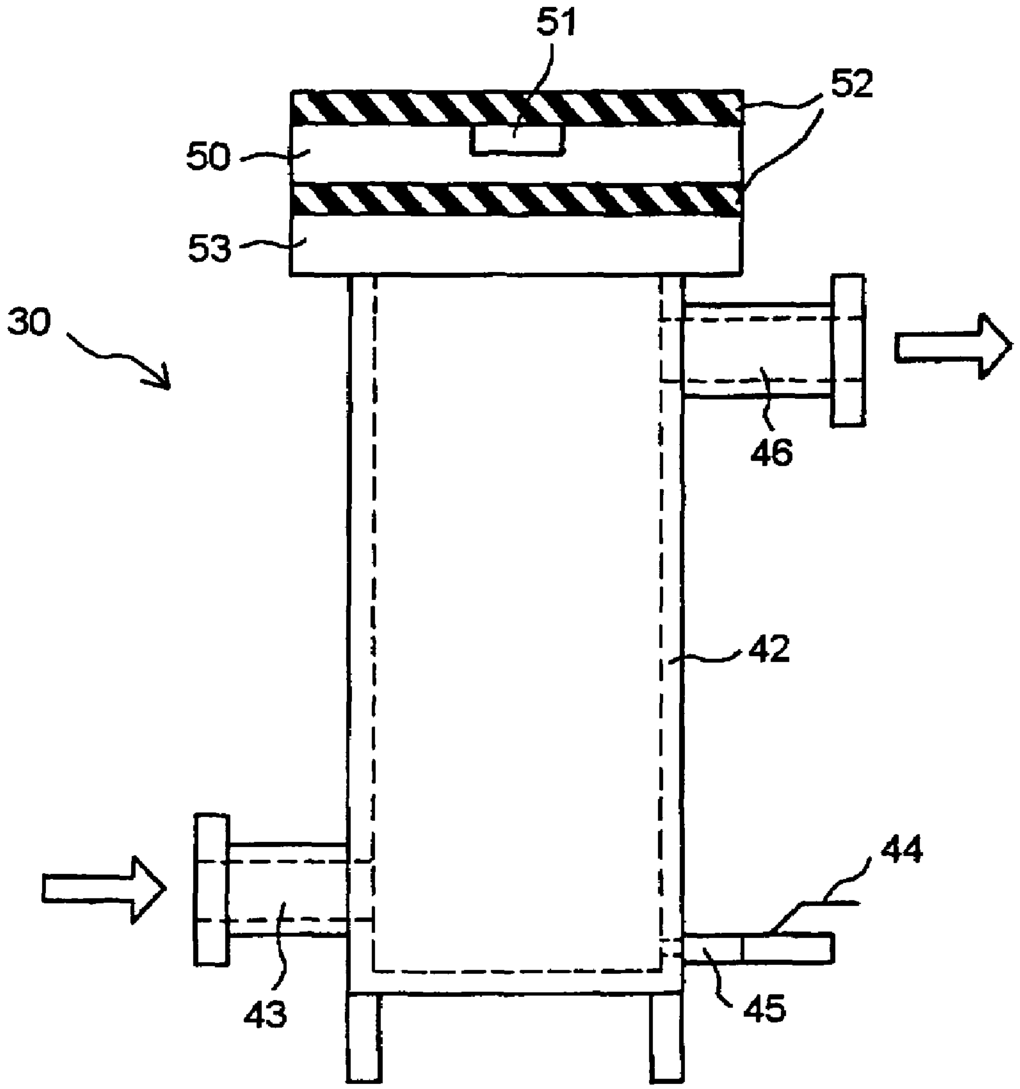
FIG. 10 is a side view of the electrolysis device shown in FIG. 9.
Figure 11:
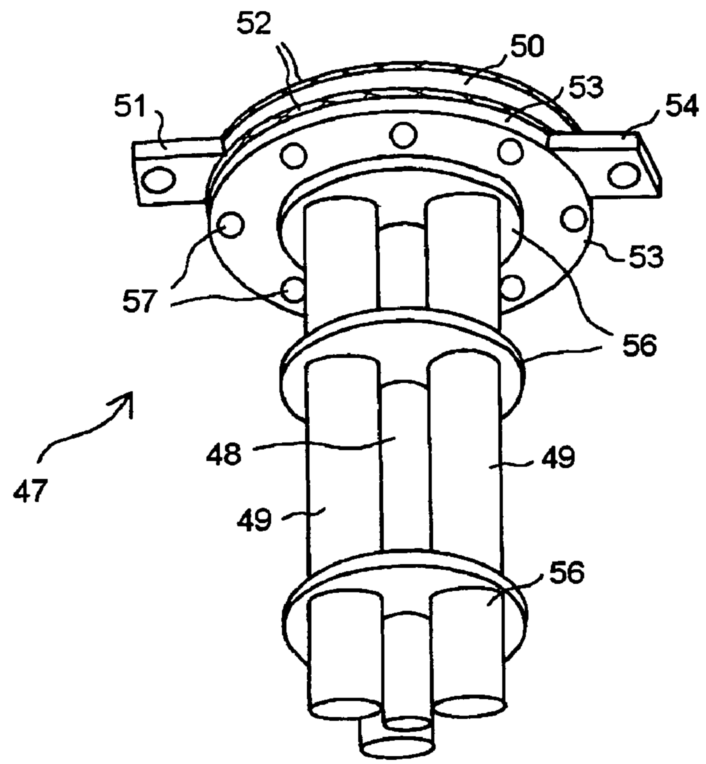
FIG. 11 is a perspective view showing the electrode part of the electrolysis device shown in FIG. 9.
Figure 12A:
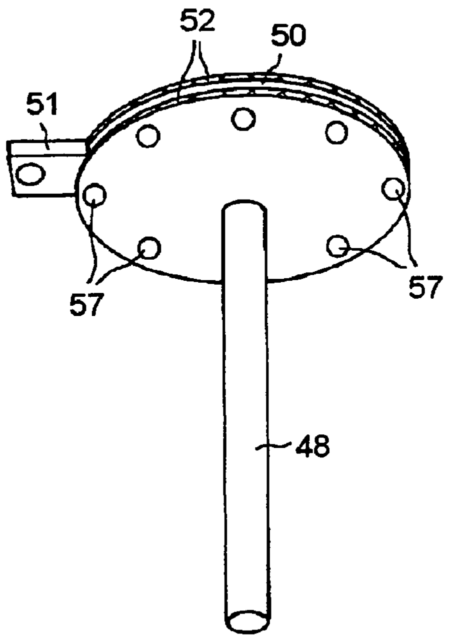
FIG. 12A and FIG. 12B are the perspective views showing the anode and the cathode of the electrode part shown in FIG. 11, respectively.
Figure 12B:
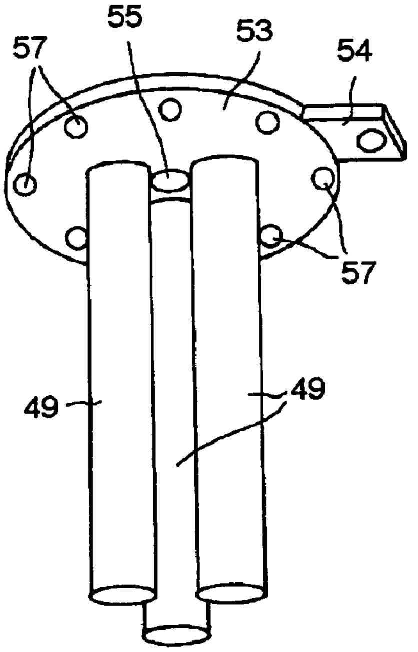

FIG. 9 is a upper view of the electrolysis device 30, FIG. 10 is a side view of FIG. 9, FIG. 11 is a perspective view of the electrode portion of the electrolysis device 30, FIGS. 12A and 12B are perspective views of the of the anode and cathode, respectively, of the electrode portion.

In FIG. 5 and FIG. 6, reference number 42 designates a main part of a cylinder-like cell with a base of the electrolysis device 30, and a decontamination solution inflow pipe 43 and a drain pipe 45 having a valve 44 are connected to the lower side of the cell main part 42 and a decontamination solution outflow pipe 46 is connected to the up side of the cell main part 42.

The electrode part 47 shown in FIG. 11 is inserted into the cell main part 42 through the upper end opening of the cell main part 42.

The electrode part 47 is mainly composed of one anode 48 and three cathodes 49 shown in FIG. 12A and FIG. 12B, respectively.

The upper end of the anode 48 is attached to a flange type anode plate 50 having an anode terminal 51 on the side of the anode plate 50, and vertical both sides of the anode plate 50 are covered with insulators 52.

On the other hand, the upper ends of three cathodes 49 are attached to a flange type cathode plate 53 having a cathode terminal 54 on the side of the cathode plate 53 and an anode insertion hole 55 through which the anode 48 is inserted in the center of the cathode plate 53.

By inserting the anode 48 through the anode insertion hole 55, insulation spacers 56 intervene between the anode 48 and the three cathodes 49, as shown in FIG. 11, and the three cathodes 49 are arranged at equal intervals focusing on the anode 48.

In addition, several bolt holes 57 are formed near the periphery of the anode plate 50 and the cathode plate 53, respectively, and by inserting and tightening bolts in the bolt holes 57, the anode plate 33 and the cathode plate 36 are unified through the insulators 52 and the anode 48 and the three cathodes 49 are inserted into the cell main part 42.

By using this electrolysis device 30 to electrolyze, $Fe^{3+}$ ions can be reduced to $Fe^{2+}$ ions at the cathode 49, and $Fe^{2+}$ ions can be oxidized to $Fe^{3+}$ ions at the anode 48.

Changing the polarity of the direct current power source 34 enables to perform these reduction and oxidization reactions, and, thereby, the target reactant can be obtained easily.

Moreover, as for the electrode area of the anode 48 or the cathode 49, the target reactant can be obtained efficiently by holding one electrode area three or more times as large as the opposite electrode area, that is, by holding in a situation that two electrodes which differ polarity each other have different surface areas, one of which is more than three times as large as the another one.

The electrolysis device 30 can be miniaturized by forming the anode 48 and the cathode 49 into cylindrical electrodes, and by equalizing the length of each of the anode 48 and the cathode 49, the electrode surface area can be changed easily by changing its diameter size and thus the target resultant can be uniformly obtained on the electrode surface.

Above-mentioned embodiments mainly concern dissolution and decontamination of metal oxide containing radionuclide which generates on metal surface, however, the present invention is not limited this situation, it can be applied broadly to decontamination of material which adheres to or is generated onto a metal surface.

According to this invention, corrosion of metal base of a contaminated component can be suppressed and material soundness after decontamination can be secured.

Moreover, According to this invention, by adjusting valance of iron ions in the decontamination solution or decomposing organic acid dissolving in the decontamination solution certainly in a short time, corrosion of metal base of a contaminated component can be suppressed.

The foregoing discussion discloses and describes merely a number of exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting, of the scope of the invention, which is set forth in the following claims. Thus, the present invention may be embodied in various ways within the scope of the spirit of the invention.

What is claimed is:

1. A method of treating a chemical decontamination solution, comprising:

preparing a chemical decontamination solution, in which organic acid is dissolved, for dissolving oxide film adhered to a contaminated component;

dissolving the oxide film adhered to the contaminated component with the chemical decontamination solution;

electrolyzing the chemical decontamination solution to decompose the organic acid dissolved in the chemical decontamination solution at an anode; and adding ozone in the chemical decontamination solution to decompose the organic acid dissolved in the chemical decontamination solution;

wherein in the electrolyzing of the chemical decontamination solution, a polarity of a direct power source is changed to adjust valence states of iron ions which have been provided in the chemical decontamination solution; and wherein in the adding of ozone in the chemical decontamination solution, a polarity of a direct power source is changed to decompose organic acid dissolved in the chemical decontamination solution.

2. The treatment method of the chemical decontamination solution as recited in claim 1:

wherein before the adding of ozone in the chemical decontamination solution, a decomposition additive agent, which suppresses corrosion of a metal base of the contaminated component, is added in the chemical decontamination solution.

3. The treatment method of the chemical decontamination solution as recited in claim 2:

wherein the decomposition additive agent is at least one selected from the group consisting of carbonic acid, carbonate, hydrogencarbonate, boric acid, borate, sulfuric acid, sulfate, phosphoric acid, phosphate, and hydrogenphosphate.

* * * * *